(12) United States Patent
Honkura et al.

(10) Patent No.: US 7,278,219 B2
(45) Date of Patent: Oct. 9, 2007

(54) MAGNETIC COMPASS

(75) Inventors: Yoshinobu Honkura, Aichi (JP);
Katsuhiko Tsuchida, Aichi (JP);
Hitoshi Aoyama, Aichi (JP); Eiji Kako, Aichi (JP)

(73) Assignee: Aichi Micro Intelligent Corporation, Tokai-shi (JP)

( * ) Notice: Subject to any disclaimer, the term of this patent is extended or adjusted under 35 U.S.C. 154(b) by 0 days.

(21) Appl. No.: 11/421,900

(22) Filed: Jun. 2, 2006

(65) Prior Publication Data

US 2007/0084070 A1   Apr. 19, 2007

(30) Foreign Application Priority Data

Oct. 19, 2005   (JP) .............................. 2005-304226

(51) Int. Cl.
*G01C 17/38* (2006.01)

(52) U.S. Cl. ....................... 33/356; 33/355 R
(58) Field of Classification Search .............. 33/355 R, 33/356, 355 D See application file for complete search history.

(56) References Cited

U.S. PATENT DOCUMENTS

| | | | |
|---|---|---|---|
| 4,807,462 A | 2/1989 | Al-Attar | |
| 5,737,226 A | 4/1998 | Olson et al. | |
| 6,962,001 B2 * | 11/2005 | Yano et al. | 33/355 R |
| 2006/0190174 A1 * | 8/2006 | Li et al | 33/356 |
| 2006/0288597 A1 * | 12/2006 | Parks et al. | 33/356 |
| 2007/0101596 A1 * | 5/2007 | Olson et al. | 33/356 |

FOREIGN PATENT DOCUMENTS

| | | |
|---|---|---|
| JP | 62-8011 | 1/1987 |
| JP | 6-58758 | 3/1994 |
| JP | 9-68431 | 3/1997 |
| JP | 2005-61969 | 3/2005 |

* cited by examiner

*Primary Examiner*—Yaritza Guadalupe-McCall
(74) *Attorney, Agent, or Firm*—Oblon, Spivak, McClelland, Maier & Neustadt, P.C.

(57) ABSTRACT

A magnetic compass includes: a three-axis magnetic sensor for detecting geomagnetic vector as geomagnetic components in directions of three orthogonal axes x, y, and z; a data-plane calculating unit for calculating a data plane on which output data of the three-axis magnetic sensor are present in a sensor coordinate system of the three axes x, y, and z; a unit vector calculating unit for calculating unit vectors of a horizontal coordinate system of three orthogonal axes X, Y, and Z whose Z-axis runs vertically and X-Y plane defines a horizontal plane relative to the earth; a horizontal coordinate system conversion unit for converting geomagnetic components in the sensor coordinate system detected by the three-axis magnetic sensor into geomagnetic components in the horizontal coordinate system; an azimuth calculating unit for calculating azimuth based on the converted geomagnetic components in the horizontal coordinate system; and a display unit for displaying the calculated azimuth.

4 Claims, 10 Drawing Sheets

MAGNETIC COMPASS

CROSS-REFERENCES TO RELATED APPLICATIONS

The present application claims priority under 35 U.S.C. §119 to Japanese Patent Application No. 2005-304226, filed Oct. 19, 2005, entitled "MAGNETIC COMPASS". The contents of this application are incorporated herein by reference in their entirety.

BACKGROUND OF THE INVENTION

1. Field of the Invention

The present invention relates to a magnetic compass for determining azimuth by detecting the geomagnetism.

2. Description of the Related Art

Conventionally, there is a technique of determining azimuth by horizontally placing a magnetic sensor with a two-dimensional direction sensitivity and detecting the horizontal component of the geomagnetism.

However, this technique faces significant errors when the magnetic sensor is placed at an inclination.

In view of this, in order to allow accurate azimuth to be obtained even when the sensor is placed at an arbitrary angle, there is a technique in which both a 3-axis magnetic sensor and an inclination sensor are used. The 3-axis magnetic sensor has three mutually orthogonal sensing directions. The inclination sensor is composed of acceleration sensors or the like, and can detect inclination relative to the horizontal plane. The accurate azimuth is determined using the detected geomagnetic vector and correct it with obtained inclination.

However, the use of the inclination sensor may make it difficult to achieve low cost or low power consumption system. Further, the inclination sensor picks up noise due to vibration or mechanical impact, which may inevitably result in the occurrence of errors.

In view of this, with a view to achieving lower cost and higher accuracy, there has been a demand in recent years for a technique that allows inclination detection to be performed without using an inclination sensor. As a technique that meets this demand, there have been disclosed an azimuth measuring device and an azimuth measuring method in Japanese Unexamined Patent Application Publication No. 2005-61969. This technique is proposed as a method that enables azimuth measurement to be performed using a three-axis magnetic sensor even when the azimuth measuring device assumes an arbitrary attitude (inclination).

According to this method, when the user measures an azimuth while holding the azimuth measuring device in horizontal, geomagnetic components in mutually orthogonal directions are detected by geomagnetism detecting means of the azimuth measuring device. This horizontal state is defined as a first attitude. While keeping the azimuth of the azimuth measuring device, the attitude of the azimuth measuring device different from the first attitude is set. This attitude is defined as the second attitude. The first triaxial output data indicative of geomagnetic components in the first attitude, and the second triaxial output data indicative of geomagnetic components in the second attitude are detected by the geomagnetism detecting means, respectively.

Next, on the basis of the first triaxial output data and the second triaxial output data, the angular difference between the first attitude and the second attitude is calculated by angular difference calculating means. Then, on the basis of the first attitude and the angular difference, the second attitude is determined by inclination calculating means. Lastly, on the basis of the second attitude and the second triaxial output data, the azimuth in the second attitude is calculated by azimuth calculating means.

As described above, to perform azimuth measurement using the above-mentioned azimuth measuring device, it is necessary for the user to perform the following extremely complicated operation. That is, the user holds the azimuth measuring device in horizontal, and while maintaining the azimuth obtained in the first attitude, brings the azimuth measuring device into the second attitude that provides the second attitude. For this reason, the azimuth measuring device proves extremely inconvenient and unpractical for measuring the azimuth of a movable body such as an automobile.

SUMMARY OF THE INVENTION

The present invention has been made in view of the above-mentioned problems associated with the prior art. Accordingly, it is an object of the present invention to provide a low-cost magnetic compass that enables easy and accurate azimuth measurement irrespective of its installation angle.

According to the present invention, there is provided a magnetic compass including: a three-axis magnetic sensor of which 3 axes defines the sensor coordinate system x, y, and z; data-plane calculating means for calculating a data plane on which output data sets of the three-axis magnetic sensor are present when the three-axis magnetic sensor changes its orientation to at least three different arbitrary directions within a horizontal plane; unit vector calculating means for calculating unit vectors of a horizontal coordinate system of three orthogonal axes X, Y, and Z whose Z-axis defines a vertical direction and whose X-Y plane defines a horizontal plane relative to the earth; horizontal coordinate system conversion means for converting the geomagnetic components in the sensor coordinate system into geomagnetic components in the horizontal coordinate system; azimuth calculating means for calculating an azimuth on the basis of the converted geomagnetic components in the horizontal coordinate system; and display means for displaying the calculated azimuth (first aspect).

Next, the effects of the present invention will be described.

The above-mentioned magnetic compass converts the geomagnetic components detected by the three-axis magnetic sensor into geomagnetic components in the horizontal coordinate system by the horizontal coordinate system conversion means, and calculates azimuth by the azimuth calculating means on the basis of the geomagnetic components thus obtained. Accordingly, accurate azimuth can be detected even when the sensor coordinate system is inclined with respect to the horizontal plane relative to the earth. That is, on the basis of the geomagnetic vector detected by the inclined three-axis magnetic sensor, the geomagnetic vector that should have been obtained if the three-axis magnetic sensor had not been inclined can be obtained as the geomagnetic components in the horizontal coordinate system.

Accordingly, even when the three-axis magnetic sensor is inclined, accurate azimuth can be detected just as when the three-axis magnetic sensor is placed horizontally. That is, the magnetic compass enables easy and accurate azimuth measurement irrespective of the installation angle.

Further, the data plane can be readily calculated by the data-plane calculating means. Accordingly, even when the attitude of the three-axis magnetic sensor changes, the data plane is readily calculated again each time such change occurs, thereby making it possible to continue accurate azimuth measurement.

Further, the magnetic compass performs correction for an inclination on the basis of the detection signal of the three-axis magnetic sensor, thus obviating the need to use an inclination sensor or the like. Accordingly, a low cost, low power consumption magnetic compass can be obtained.

Further, no inclination sensor which might pick up noise due to vibration or mechanical impact is used, thus facilitating accurate azimuth measurement.

As described above, according to the present invention, it is possible to provide a low-cost magnetic compass that enables easy and accurate azimuth measurement to be performed irrespective of its installation angle.

According to the first aspect of the present invention, it is preferable that the magnetic compass includes gain/offset correcting means for performing gain/offset correction on the obtained geomagnetic components in the horizontal coordinate system conversion means. In this case, even more accurate azimuth detection can be performed. For instance, when the sensitivity or output characteristics of the three-axis magnetic sensor are not uniform with respect to the x, y, and z directions or when a certain noise signal is present, the gain/offset can be corrected.

In the first aspect of the present invention, it is preferable that the unit vector calculating means includes: Z-axis unit vector calculating means for calculating the unit vector along the horizontal coordinate system's Z-axis expressed in the sensor coordinate system; Y-axis unit vector calculating means for calculating the unit vector along the horizontal coordinate system's Y-axis expressed in the sensor coordinate system, on the basis of the calculated Z-axis unit vector; and X-axis unit vector calculating means for calculating the unit vector along the horizontal coordinate system's X-axis expressed in the sensor coordinate system on the basis of the calculated Y-axis unit vector and the calculated Z-axis unit vector (second aspect).

In this case, the respective unit vectors can be calculated with ease and accuracy.

Further, it is preferable that the three-axis magnetic sensor be arranged in a rear-view interior mirror of a vehicle so that the azimuth of travel of the vehicle can be accurately detected (third aspect).

Usually, the rear-view interior mirror of the vehicle is adapted so that its angle can be freely changed in accordance with the driver's eye level or preference. Accordingly, even when the three-axis magnetic sensor is installed horizontally in the interior mirror, the orientation may be changed by each individual driver so that the three-axis magnetic sensor is inclined with respect to the horizontal plane. In such cases, the magnetic compass according to the present invention enables accurate azimuth detection to be performed even when the three-axis magnetic sensor is inclined.

Further, in the vehicle, the interior mirror is suitable as the installation location for a magnetic sensor for accurately detecting the geomagnetism. In this regard, since a vehicle body is normally made of a magnetic member, it may be magnetized due to all kinds of factors, and the direction and intensity of the magnetization thereof vary. Accordingly, the influence of the magnetism generated from the vehicle body itself may extend to the magnetic sensor. The location relatively free from such an influence is the vicinity of the window that is a non-magnetic member. Hence, the interior mirror is chosen as the location where the three-axis magnetic sensor can be installed in the vicinity of the window.

It should be noted that the three-axis magnetic sensor of the magnetic compass according to the present invention may not necessarily be installed in the interior mirror of the vehicle. For example, the three-axis magnetic sensor can be installed in other locations such as a mascot doll placed on the dashboard, the window of a rear door, or the rear window. Further, other than installation in a vehicle, there are various methods of using the magnetic compass according to the present invention, such as installing it in a ship, a mobile robot, an automatic guided vehicle, or the like to measure the traveling direction thereof.

Further, it is preferable that the three-axis magnetic sensor includes a magneto-impedance sensor element (fourth aspect).

This readily enables the construction of a high-accuracy and small three-axis magnetic sensor.

That is, since the magneto-impedance sensor element (MI element) has high sensitivity, a very weak geomagnetism can be detected with high accuracy. Furthermore, due to the small size of the magneto-impedance sensor element, it is possible to obtain a small three-axis magnetic sensor.

It should be noted that the three-axis magnetic sensor can be formed by arranging three such magneto-impedance sensors in a manner such that their respective magnetic sensitivity directions run in three mutually orthogonal axis directions.

It should be noted that the three-axis magnetic sensor might not necessarily be composed of the magneto-impedance sensor elements. For example, the three-axis magnetic sensor may be formed using various kinds of magnetism-detecting elements such as Hall elements, magneto-resistance elements, or flux gates.

DESCRIPTION OF THE PREFERRED EMBODIMENTS

A magnetic compass according to the present invention will be described with reference to FIGS. 1 to 10.

Figure 2:
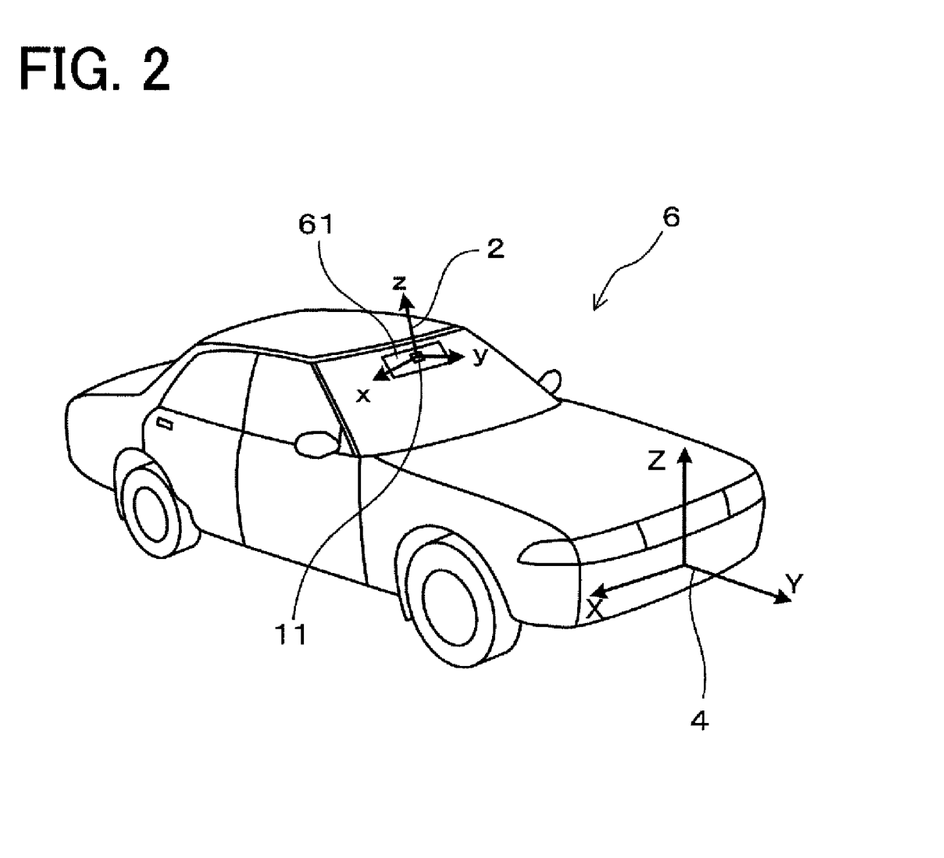
FIG. 2 is a perspective view of a vehicle to which the magnetic compass is mounted according to the embodiment of the present invention.
Figure 3:
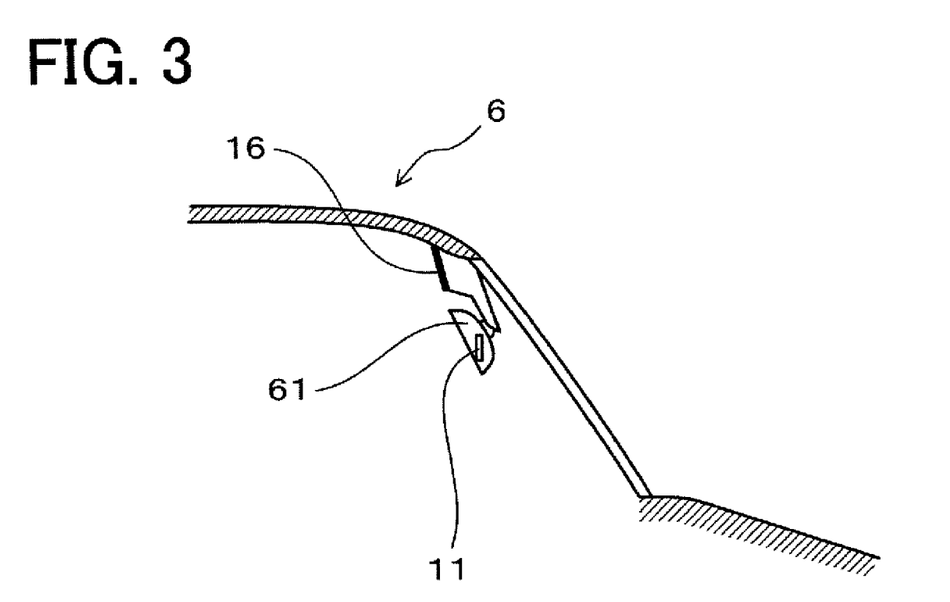
FIG. 3 is an explanatory view of an interior mirror of the vehicle to which a three-axis magnetic sensor is mounted according to the embodiment of the present invention.

As shown in FIGS. 2 and 3, a magnetic compass 1 according to an embodiment of the present invention is mounted to a vehicle 6 and used to measure the azimuth of travel of the vehicle 6.

Figure 1:
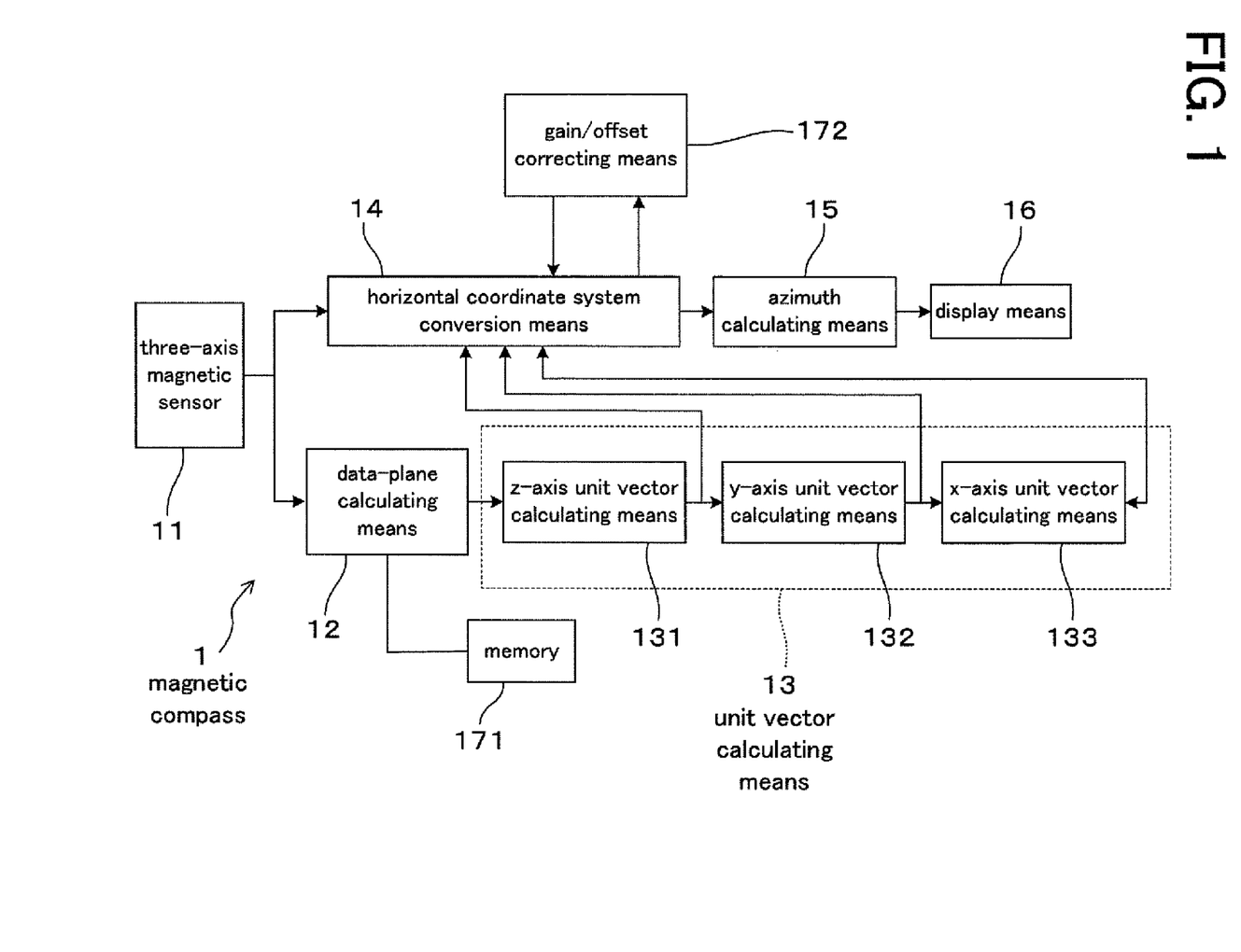
FIG. 1 is a block diagram showing the configuration of a magnetic compass according to an embodiment of the present invention.

As shown in FIG. 1, the magnetic compass 1 has a three-axis magnetic sensor 11, data-plane calculating means 12, unit vector calculating means 13, horizontal coordinate conversion means 14, azimuth calculating means 15, and display means 16.

Figure 5:
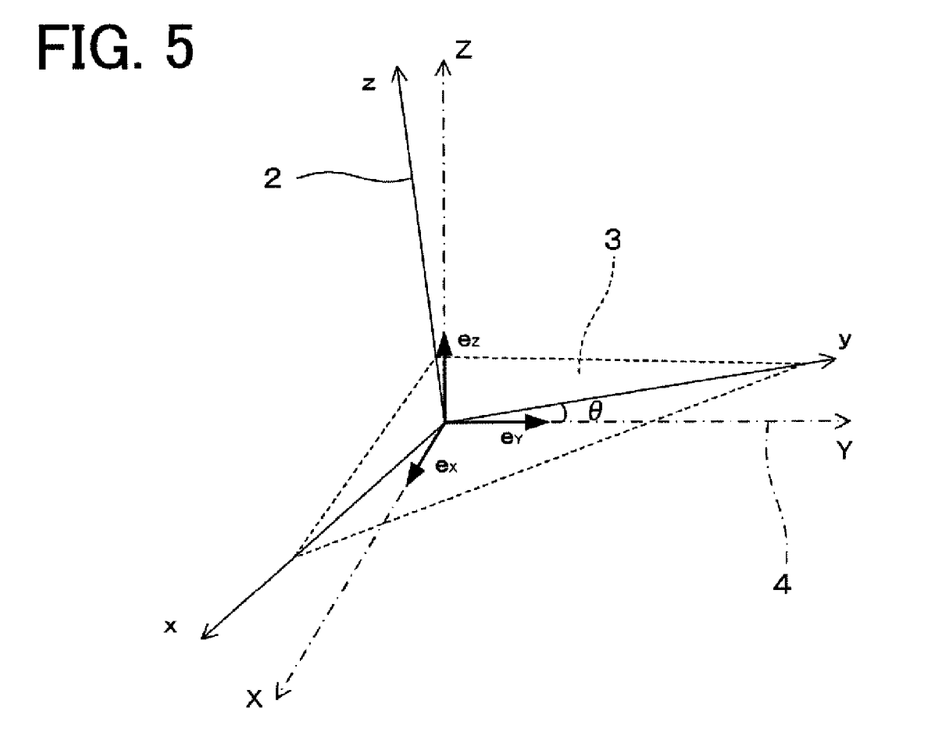
FIG. 5 is an explanatory diagram showing the relationship between a sensor coordinate system and a horizontal coordinate system according to the embodiment of the present invention.

The three-axis magnetic sensor 11 detects geomagnetic vector in the form of magnetic components in the directions of three mutually orthogonal axes x, y, and z as shown in FIGS. 2 and 5.

By using geomagnetic vector detected by the three-axis magnetic sensor 11 as the three-axis magnetic sensor 11 changes its orientation to at least three different arbitrary directions within the horizontal plane, as shown in FIG. 5, the data-plane calculating means 12 calculates a data plane 3 in which the output data of the three-axis magnetic sensor 11 are present in a sensor coordinate system 2 defined by the three axes x, y, and z.

The unit vector calculating means 13 calculates unit vectors ($e_X$, $e_Y$, and $e_Z$) of a horizontal coordinate system 4 defined by three axes X, Y, and Z, of which the Z-axis defines the vertical direction and the X-Y plane defines the horizontal plane relative to the earth.

The horizontal coordinate system conversion means 14 converts the geomagnetic components in the sensor coordinate system 2 as detected by the three-axis magnetic sensor 11 into geomagnetic components in the horizontal coordinate system 4.

The azimuth calculating means 15 calculates azimuth on the basis of the geomagnetic components in the horizontal coordinate system 4 thus converted.

Then, the display means 16 displays the azimuth calculated by the azimuth calculating means 15.

Further, as shown in FIG. 1, the unit vector calculating means 13 is composed of Z-axis unit vector calculating means 131, Y-axis unit vector calculating means 132, and X-axis unit vector calculating means 133.

The Z-axis unit vector calculating means 131 calculates the unit vector $e_Z$ along the Z-axis of the horizontal coordinate system 4. The Y-axis unit vector calculating means 132 calculates the unit vector $e_Y$ along the Y-axis of the horizontal coordinate system 4 on the basis of the calculated Z-axis unit vector $e_Z$. The X-axis unit vector calculating means 133 calculates the unit vector $e_X$ along the X-axis of the horizontal coordinate system 4 on the basis of the calculated Y-axis unit vector $e_Y$ and Z-axis unit vector $e_Z$.

Figure 4:
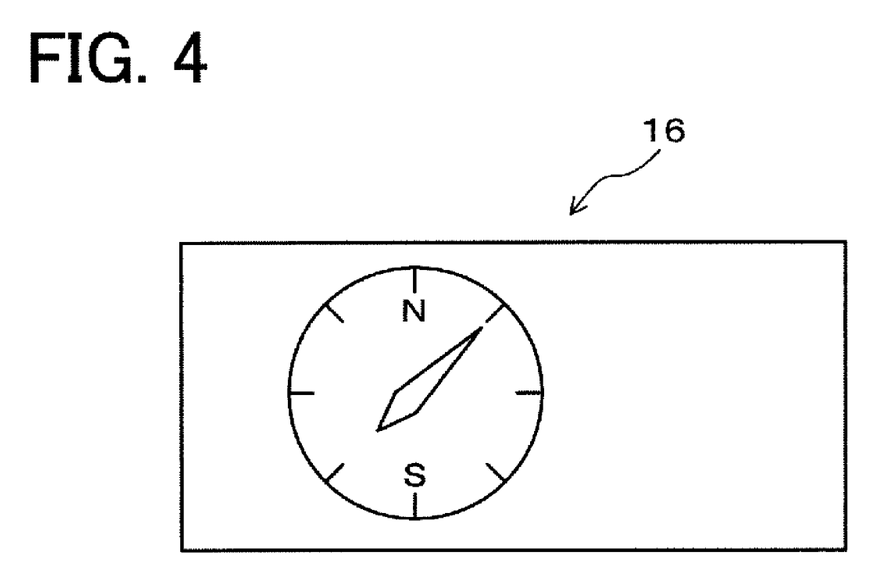
FIG. 4 is an explanatory view of azimuth information displayed in display means according to the embodiment of the present invention.

As shown in FIG. 3, the three-axis magnetic sensor 11 is built in a rear-view interior mirror 61 of the vehicle 6. The display means 16 is arranged above the interior mirror 61. A liquid crystal display with a backlight, for example, may be adopted as the display means 16. As shown in FIG. 4, the display means 16 is adapted to be capable of visual display of the azimuth of the vehicle 6.

Figure 8:
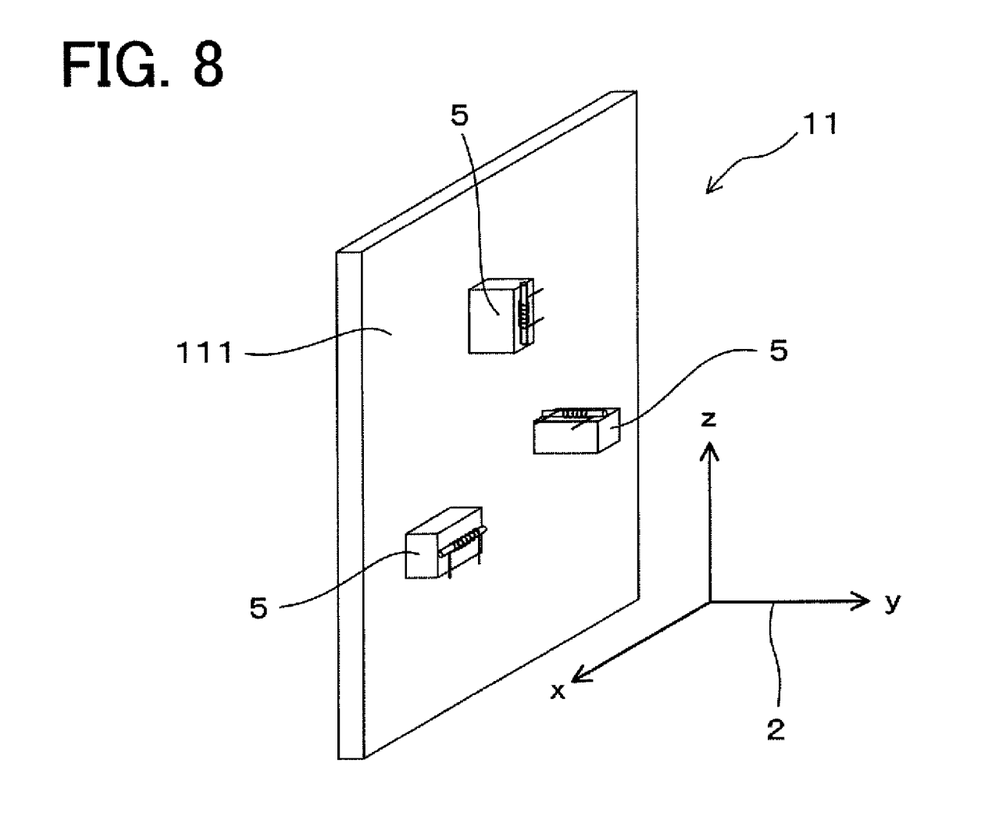
FIG. 8 is a perspective view of the three-axis magnetic sensor according to the embodiment of the present invention.
Figure 9:
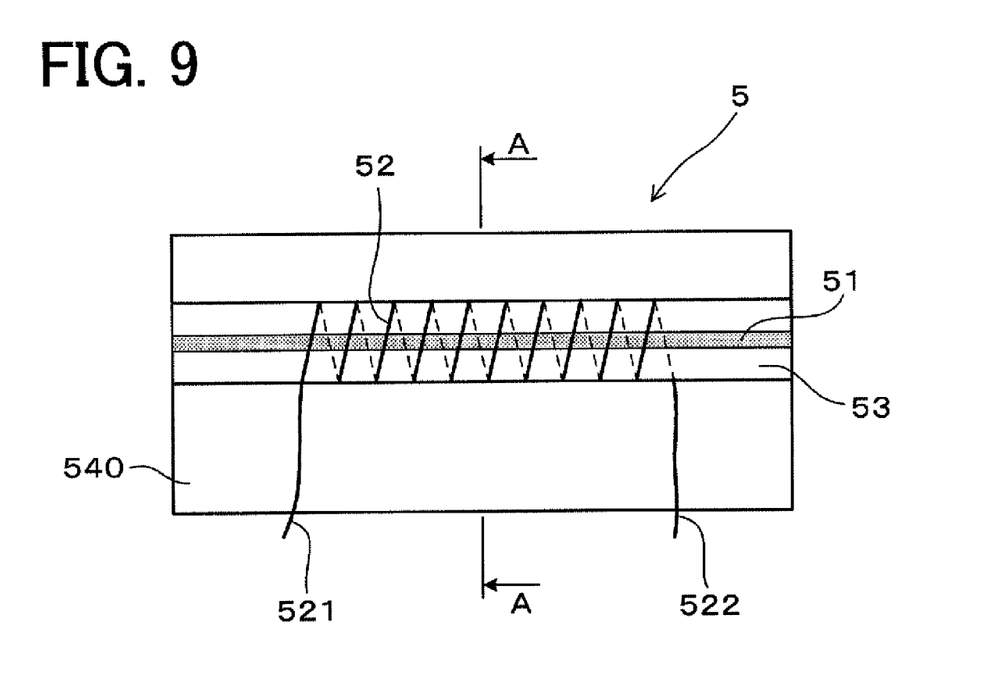
FIG. 9 is a plan view of a magneto-impedance sensor element according to the embodiment of the present invention.
Figure 10:
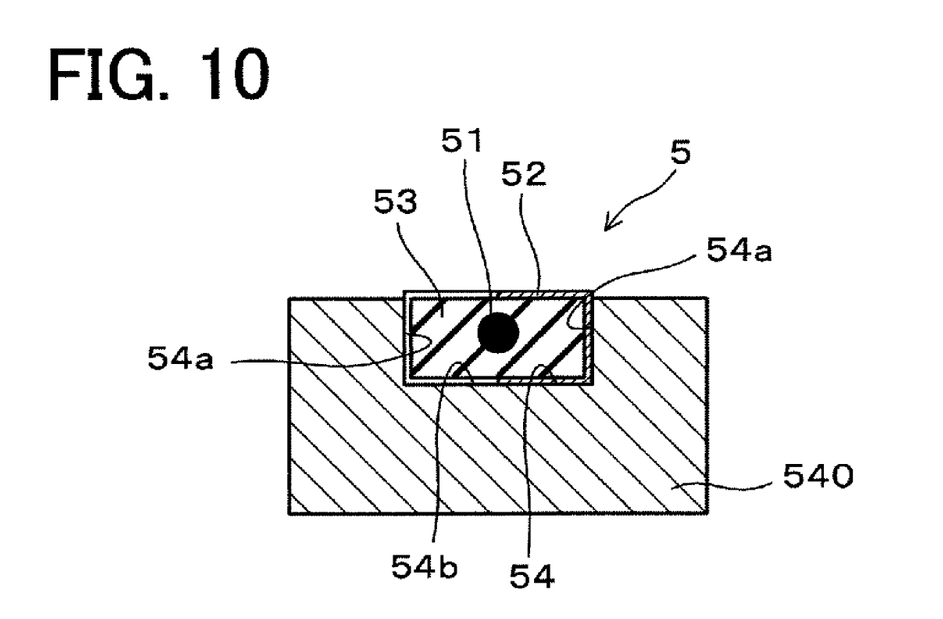
FIG. 10 is a sectional view taken along the line A-A of FIG. 9.

As shown in FIGS. 8 to 10, the three-axis magnetic sensor 11 is formed using magneto-impedance sensor elements 5. That is, as shown in FIG. 8, three magneto-impedance sensor elements 5 are disposed on a substrate 111 such that their respective magnetic sensitive directions become the directions of three mutually orthogonal axes, thereby forming the three-axis magnetic sensor 11. It should be noted that in FIG. 8, electronic components other than the magneto-impedance sensor elements 5 and wirings are omitted.

As shown in FIGS. 9 and 10, each magneto-impedance sensor element 5 has a magnetic sensitive element 51 and a detection coil 52 wound around the magnetic sensitive element 51. The magnetic sensitive element 51 extends through an insulator 53 made of epoxy resin or the like. The detection coil 52 is arranged on the outer peripheral surface of the insulator 53. The magnetic sensitive element 51 used is, for example, an amorphous metal wire consisting of a $Co_{68.1}Fe_{4.4}Si_{12.5}B_{15.0}$ alloy having a length of 1.0 mm and a diameter of 20 μm.

Each magneto-impedance sensor element 5 performs magnetic sensing utilizing the so-called MI (Magneto-impedance) phenomenon whereby as the current supplied to the magnetic sensitive element 51 changes, an induced voltage corresponding to the magnitude of the magnetic field acting on the element is generated in the detection coil 52. This MI phenomenon occurs in the magnetic sensitive element 51 made of a magnetic material having the arrangement of electron spin in the circumferential direction with respect to the direction of the supplied current. When the current supplied to the magnetic sensitive element 51 is abruptly changed, the magnetic field in the circumferential direction abruptly changes. The change in the magnetic field causes the electron spin direction to change in accordance with the peripheral magnetic field. The above-mentioned MI phenomenon refers to a phenomenon whereby changes occur in the internal magnetization, impedance, and the like of the magnetic sensitive element 51 at this time.

Further, in this embodiment, the intensity of the magnetic field is detected by measuring the induced voltage that is generated between an electrode 521 and an electrode 522 at the ends of the detection coil 52 upon supplying a pulse-like current (pulsed current) to the magnetic sensitive element 51. This magnetism detecting method involves measuring the induced voltage generated in the detection coil 52 during the fall of the pulsed current supplied to the magnetic sensitive element 51.

Further, as shown in FIG. 10, each magneto-impedance sensor element 5 is formed on an element substrate 540 provided with a groove-like recess 54 of 5 to 200 μm in depth having a substantially rectangular cross-sectional configuration. The insulator 53 is filled in the inner portion of the recess 54, with the magnetic sensitive element 51 being embedded in the insulator 53.

A conductive pattern is continuously formed in a spiral fashion in the inner peripheral surface of the recess 54 and in the side surface of the insulator 53 that is arranged at the position of the opening of the recess 54. The conductive pattern constitutes the detection coil 52 wound around the magnetic sensitive element 51.

It should be noted that as the method of forming the conductive pattern of the detection coil 52, the following method may be employed, for example. That is, a conductive metallic thin film is formed by vapor-deposition on the inner peripheral surface of the recess 54, followed by etching processing to thereby form a conductive pattern. Thereafter, the insulator 53 and the magnetic sensitive element 51 are arranged in the recess 54. Then, a conductive metallic thin film is formed by vapor-deposition on the side surface of the insulator 53, followed by etching processing to thereby form a conductive pattern. At this time, the conductive pattern formed on the inner peripheral surface of the recess 54 and the conductive pattern formed on the side surface of the insulator 53 are made electrically in contact so that the pattern becomes continuous in a spiral fashion.

The inner diameter of the winding of the detection coil 52 according to this embodiment is 66 μm as a circle-equivalent inner diameter representing the diameter of a circle having the same sectional surface area as that of the recess 54. The line width and line-to-line width of the detection coil 52 are both set at 25 μm. It should be noted that FIG. 9 takes no account of the line width and line-to-line width.

Next, an azimuth measuring method using the magnetic compass 1 of this embodiment will be specifically described.

First, as a precondition, as shown in FIGS. 2 and 5, the respective axes in the sensor coordinate system 2 are taken as the x-axis, the y-axis, and the z-axis, and the respective axes in the horizontal coordinate system 4 are taken as the X-axis, the Y-axis, and the Z-axis. Further, in the horizontal coordinate system 4, the X-Y plane is set to be the horizontal plane relative to the earth, and the Z-axis direction is set to be oriented vertically upwards. The traveling direction of the vehicle 6 is taken as the Y-axis direction. It should be noted, however, that the traveling direction of the vehicle 6 at this time is assumed in the horizontal plane.

The three-axis magnetic sensor 11 is built in the casing of the interior mirror 61 of the vehicle 6. The mounting attitude of the three-axis magnetic sensor 11 is basically such that the y-axis direction lies along the traveling direction of the vehicle 6, the z-axis direction is oriented vertically upwards, and the x-axis direction runs in the rightward direction of the vehicle 6. That is, the three-axis magnetic sensor 11 is basically installed such that the sensor coordinate system 2 coincides with the horizontal coordinate system 4.

However, since the interior mirror 61 is inclined up or down or to the front or rear, that is, in the pitch direction depending on the driver's eye level or the like, the sensor coordinate system 2 may be displaced in the direction around the x-axis or the y-axis. It should be noted that since there is normally no fear of the interior mirror 61 being largely moved around the z-axis in accordance with the driver's eye level or the like, the displacement around the z-axis will not be taken into account herein.

Under the above-mentioned precondition, first, the three-axis magnetic sensor 11 mounted to the vehicle 6 successively detects geomagnetic vector as the vehicle 6 runs. The direction of travel of the vehicle 6 changes but basically lies in the horizontal plane. Preferably, the vehicle runs such that its direction of travel experiences in every direction to the east and to the west and to the north and to the south.

At this time, since the vehicle 6 runs in an arbitrary direction on the ground surface (horizontal plane), the orientations of the geomagnetic vector successively detected by the three-axis magnetic sensor 11 differ from each other. That is, n geomagnetic vectors H1, H2, . . . Hn detected on the time series basis by the three-axis magnetic sensor 11 can be represented as follows as the vectors in the sensor coordinate system 2: $H1=(H_{x1}, H_{y1}, H_{z1})$, $H2=(H_{x2}, H_{y2}, H_{z2})$, . . . $Hn=(H_{xn}, H_{yn}, H_{zn})$. Here, n represents an integer of 3 or more.

The data of the geomagnetic vectors are stored in a memory 171.

Then, the data plane 3 (FIG. 5) in which these data are presented in the sensor coordinate system 2 is determined by the data-plane calculating means 12 using the geomagnetic vector data. Specifically, the geomagnetic vector data $(H_{x1}, H_{y1}, H_{z1})$, $(H_{x2}, H_{y2}, H_{z2})$, . . . $(H_{xn}, H_{yn}, H_{zn})$ are substituted into the (x, y, z) in the expression (1) below.

$$Ax+By+Cz-1=0 \quad (1)$$

The factors A, B, and C in the expression (1) can be thus determined, whereby the data plane 3 represented by the expression (1) can be obtained as the plane as viewed from the sensor coordinate system 2. It should be noted that the above-mentioned factors A, B, and C are preferably calculated using the method of least squares or other such statistical techniques on the basis of data on 4 or more geomagnetic vector data obtained by setting the value of n mentioned above to 4 or more.

Since the data plane 3 is a plane parallel to the plane in which the vehicle 6 has run (the plane in which the three-axis magnetic sensor 11 has moved), after all, it becomes parallel to the horizontal plane, that is, the X-Y plane of the horizontal coordinate system 4.

Accordingly, the unit normal vector of the calculated data plane 3 coincides with the unit vector $e_Z$ along the horizontal coordinate system 4's Z-axis expressed in the sensor coordinate system 2. Hence, the Z-axis unit vector $e_Z$ can be determined by the expression (2) below.

$$e_Z = \left( \frac{A}{\sqrt{A^2+B^2+C^2}}, \frac{B}{\sqrt{A^2+B^2+C^2}}, \frac{C}{\sqrt{A^2+B^2+C^2}} \right) \quad (2)$$

By setting $A/\sqrt{(A^2+B^2+C^2)}=a$, $B/\sqrt{(A^2+B^2+C^2)}=b$, and $C/\sqrt{(A^2+B^2+C^2)}=c$, the expression (2) can be represented as the expression (3) below.

$$e_Z=(a, b, c) \quad (3)$$

Next, the unit vector $e_Y$ along the horizontal coordinate system 4's Y-axis expressed in the sensor coordinate system 2 is calculated by the Y-axis unit vector calculating means 132. First, when the inclination of the interior mirror 61 around the x-axis of the sensor coordinate system, that is, the pitch angle, is taken as θ, the Y-axis unit vector $e_Y$ of the horizontal coordinate system 4 can be represented as follows: $e_Y=(0, \cos θ, \sin θ)$. Further, from the relationship that the inner product of the Y-axis unit vector $e_Y$ and the Z-axis unit vector $e_Z$: $e_Y \cdot e_Z=0$, it is found that $b \cos θ + c \sin θ=0$.

Using this expression and the formula $\sin^2 θ + \cos^2 θ=1$, the Y-axis unit vector $e_Y=(0, \cos θ, \sin θ)$ can be represented by the expression (4) below.

$$e_Y = \left( 0, \frac{|c|}{\sqrt{b^2+c^2}}, \frac{-|c|}{\sqrt{b^2+c^2}} \cdot \frac{b}{c} \right) \quad (4)$$

Here, by setting $|c|/\sqrt{(b^2+c^2)}=d$, and $-|c|/\sqrt{(b^2+c^2)} \times (b/c)=f$, the expression (4) can be simplified as the expression (5) below.

$$e_Y=(0, d, f) \quad (5)$$

Next, the unit vector $e_x$ along the horizontal coordinate system 4's X-axis expressed in the sensor coordinate system 2 is calculated by the X-axis unit vector calculating means 133. Since the X-axis unit vector $e_X$ is equal to the outer product of the Y-axis unit vector $e_Y$ and the Z-axis unit vector $e_Z$, the X-axis unit vector $e_X$ can be calculated by the expression (6) below.

$$e_X=e_Y \times e_Z=(cd-bf, af, -ad) \quad (6)$$

Next, the geomagnetic vector data ($H_x$, $H_y$, $H_z$) detected by the three-axis magnetic sensor 11 are input to the horizontal coordinate system conversion means 14. Then, using $e_X$, $e_Y$, and $e_Z$ thus determined, the horizontal coordinate system conversion means 14 converts the respective components $H_x$, $H_y$, and $H_z$ of the geomagnetic vector in the sensor coordinate system 2 into geomagnetic components $H_X$, $H_Y$, and $H_Z$ in the horizontal coordinate system 4. That is, the conversion is performed in accordance with the expression (7) below.

$$\begin{pmatrix} H_X \\ H_Y \\ H_Z \end{pmatrix} = \begin{pmatrix} e_X \\ e_Y \\ e_Z \end{pmatrix} \begin{pmatrix} H_x \\ H_y \\ H_z \end{pmatrix} = \begin{pmatrix} cd-bf & af & -ad \\ 0 & d & f \\ a & b & c \end{pmatrix} \begin{pmatrix} H_x \\ H_y \\ H_z \end{pmatrix} \quad (7)$$

Figure 6:
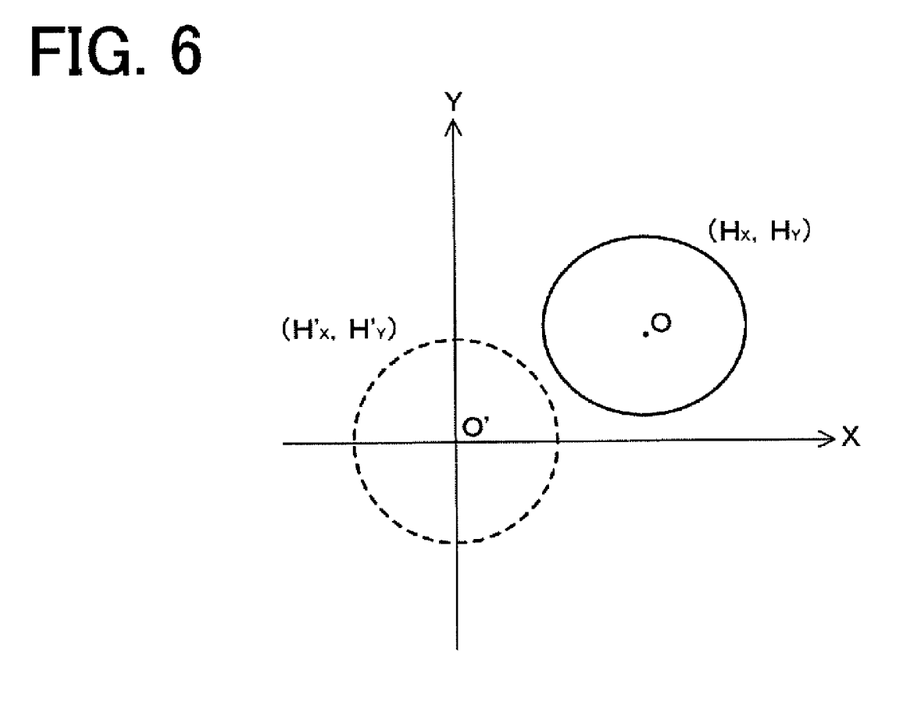
FIG. 6 is an explanatory diagram showing a gain/offset correcting method according to the embodiment of the present invention.

Further, of the determined geomagnetic components in the horizontal coordinate system 4, the gain and the offset are corrected by gain/offset correcting means 172 with respect to $H_X$ and $H_Y$. That is, provided that there is no gain error nor offset error present in the three-axis magnetic sensor 11, ($H_X$, $H_Y$) should be plotted on a true circle O′. In this regard, if a gain error and/or offset error are present, ($H_X$, $H_Y$) is arranged on an ellipse O whose center is located at the position deviated from the origin point. Accordingly, by correcting the gain and the offset, ($H′_X$, $H′_Y$) arranged on the true circle O′ whose center is located at the origin point can be obtained.

By performing correction in this way by the gain/offset correcting means 172, accurate geomagnetic components $H′_X$, $H′_Y$ are obtained as the X-axis direction and Y-axis direction components in the horizontal coordinate system, respectively.

Figure 7:
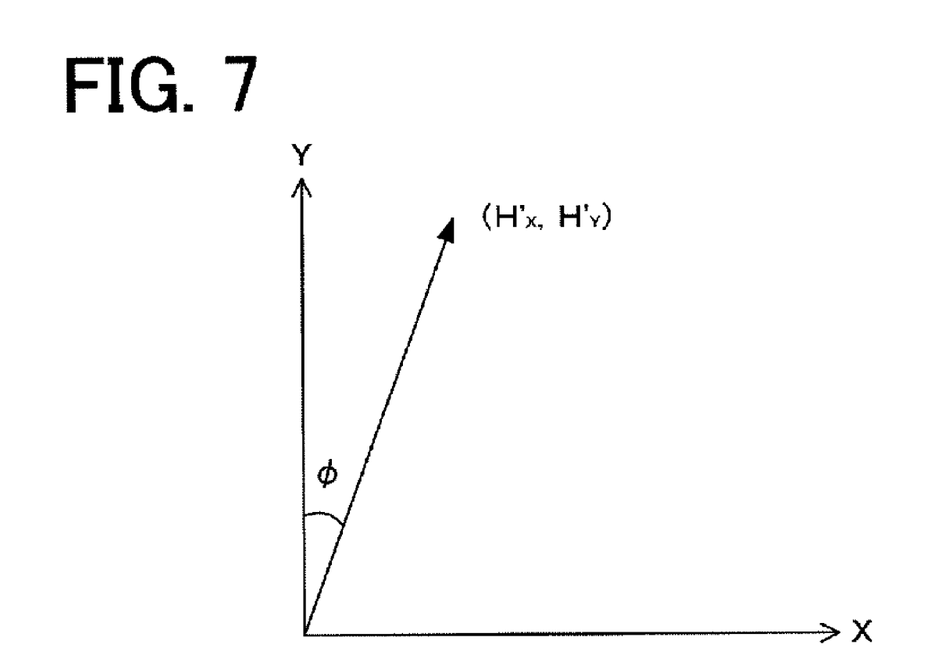
FIG. 7 is an explanatory diagram of a vector obtained by projecting a geomagnetic vector onto an X-Y plane (horizontal plane)

Subsequently, as shown in FIG. 7, the azimuth calculating means 15 calculates the angle φ formed by the vector ($H′_X$, $H′_Y$), which is obtained by projecting the geomagnetic vector onto the X-Y plane (horizontal plane), with respect to the Y-axis (traveling direction of the vehicle 6) is calculated by the expression (8) below.

$$\phi = \tan^{-1}(H′_X/H′_Y) \quad (8)$$

Then, on the basis of the calculated angle φ, the azimuth of travel of the vehicle 6 is displayed by the display means 16.

It should be noted that since the magnetic declination of the geomagnetism, and the deviation of the mounting angle of the three-axis magnetic sensor 11 on the horizontal plane (X-Y plane) are previously known, corresponding corrections can be made prior to the display by the display means 16. Here, the magnetic declination of the geomagnetism refers to the angle by which the vector obtained by projecting the geomagnetic vector onto a horizontal plane deviates from the direction of the true north. While the magnetic declination differs depending on the location on the earth, it can be regarded as substantially constant within the moving range of day-to-day vehicles, for example. Further, within Japan, the magnetic declination falls within the range of about 7°±2°.

Next, the effects of this embodiment will be described.

The magnetic compass 1 converts the components of geomagnetic vector ($H_x$, $H_y$, $H_z$) detected by the three-axis magnetic sensor 11 into the components of geomagnetic vector ($H_X$, $H_Y$, $H_Z$) in the horizontal coordinate system 4 by the horizontal coordinate system conversion means 14, and calculates azimuth by the azimuth calculating means 15 on the basis of these geomagnetic components. Accordingly, accurate azimuth can be detected even when the sensor coordinate system 2 of the three-axis magnetic sensor 11 is inclined with respect to the horizontal plane. That is, on the basis of the geomagnetic vector data detected by the inclined three-axis magnetic sensor 11, the geomagnetic vector that should have been measured if the three-axis magnetic sensor 11 had not been inclined can be determined as the geomagnetic components in the horizontal coordinate system 4.

Accordingly, even when the three-axis magnetic sensor 11 is inclined, accurate azimuth can be detected just as when the three-axis magnetic sensor 11 is placed horizontally. That is, the magnetic compass 1 enables easy and accurate azimuth measurement irrespective of the installation angle.

Further, the data plane 3 can be easily calculated by the data-plane calculating means 12. Accordingly, even when the attitude of the three-axis magnetic sensor 11 changes, the data plane 3 is readily calculated again each time such change occurs, thereby making it possible to continue accurate azimuth measurement. For instance, when the three-axis magnetic sensor 11 is mounted to the interior mirror 61 of the vehicle 6 as in this embodiment, there may be cases where the angle of the interior mirror 61 is changed during the driving of the vehicle, which also causes a change in the attitude of the three-axis magnetic sensor 11. At this time, although azimuth detection using the data plane 3 originally calculated can no longer be performed, by collecting the geomagnetic vector data again while running the vehicle 6 in an arbitrary direction, a new data plane 3 can be readily calculated again. By using the data plane 3 thus calculated again, accurate azimuth measurement can be performed again.

Further, the magnetic compass 1 performs correction for an inclination on the basis of the detection data of the three-axis magnetic sensor 11, thus obviating the need to use an inclination sensor or the like. Accordingly, a low cost, low power consumption magnetic compass 1 can be obtained.

Further, no inclination sensor which might pick up noise due to vibration or mechanical impact is used, thus facilitating accurate azimuth measurement.

Further, since the three-axis magnetic sensor 11 is arranged in the rear-view interior mirror 61 of the vehicle 6, the azimuth of travel of the vehicle 6 can be accurately detected. That is, the rear-view interior mirror 61 of the vehicle 6 is adapted so that its angle can be freely changed in accordance with the driver's eye level or preference. Accordingly, even when the three-axis magnetic sensor 11 is installed horizontally in the interior mirror 61, the orientation may be changed by each individual driver so that the three-axis magnetic sensor 11 is inclined with respect to the horizontal plane. In such cases, the magnetic compass 1 according to the present invention enables accurate azimuth detection to be performed even when the three-axis magnetic sensor 11 is inclined.

Further, in the vehicle 6, the interior mirror 61 is suitable as the installation location for the three-axis magnetic sensor 11 for accurately detecting the geomagnetism. In this regard, since a vehicle body is normally made of a magnetic member, it is magnetized due to all kinds of factors, and the direction and intensity of the magnetization thereof vary. Accordingly, the influence of the magnetism generated from the vehicle body itself may extend to the three-axis magnetic sensor 11. The location relatively free from such an influence is the vicinity of the window that is a non-magnetic member. Hence, the interior mirror 61 is chosen as the location where the three-axis magnetic sensor 11 can be installed in the vicinity of the window.

Further, the three-axis magnetic sensor 11 is constructed using the magneto-impedance sensor elements 5. This readily enables the construction of a high-accuracy and small three-axis magnetic sensor 11.

That is, since the magneto-impedance sensor elements 5 have high sensitivity, a very weak geomagnetism can be detected with high accuracy. Furthermore, due to the small size of the magneto-impedance sensor elements 5, it is possible to obtain a small three-axis magnetic sensor 11.

As has been described above, according to this embodiment, it is possible to provide a low-cost magnetic compass that enables easy and accurate azimuth measurement irrespective of its installation angle.

Obviously, numerous modifications and variations of the present invention are possible in light of the above teachings. It is therefore to be understood that, within the scope of the appended claims, the invention may be practiced otherwise than as specifically described here.

What is claimed is:

1. A magnetic compass comprising:
  a three-axis magnetic sensor for detecting geomagnetic vector as geomagnetic components of three orthogonal axes x, y, and z;
  data-plane calculating means for calculating a data plane on which output data of the three-axis magnetic sensor are present in a sensor coordinate system of the three axes x, y, and z by using geomagnetic vector data respectively detected by the three-axis magnetic sensor when the three-axis magnetic sensor changes its orientation to at least three different arbitrary directions within a horizontal plane;
  unit vector calculating means for calculating unit vectors of a horizontal coordinate system of three orthogonal axes X, Y, and Z whose Z-axis defines a vertical direction and whose X-Y plane defines a horizontal plane relative to the earth;
  horizontal coordinate system conversion means for converting the geomagnetic components in the sensor coordinate system detected by the three-axis magnetic sensor into geomagnetic components in the horizontal coordinate system;
  azimuth calculating means for calculating an azimuth on the basis of the converted geomagnetic components in the horizontal coordinate system; and
  display means for displaying the calculated azimuth.

2. The magnetic compass according to claim 1, wherein the unit vector calculating means includes:
  Z-axis unit vector calculating means for calculating the unit vector along the horizontal coordinate system's Z-axis expressed in the sensor coordinate system;
  Y-axis unit vector calculating means for calculating the unit vector along the horizontal coordinate system's Y-axis expressed in the sensor coordinate system on the basis of the calculated Z-axis unit vector; and
  X-axis unit vector calculating means for calculating the unit vector along the horizontal coordinate system's X-axis expressed in the sensor coordinate system on the basis of the calculated Y-axis unit vector and the calculated Z-axis unit vector.

3. The magnetic compass according to claim 1, wherein the three-axis magnetic sensor is arranged in a rear-view interior mirror of a vehicle.

4. The magnetic compass according to claim 1, wherein the three-axis magnetic sensor includes a magneto-impedance sensor element.

* * * * *